(No Model.) 2 Sheets—Sheet 1.

G. W. MURRAY.
COMBINED FURROW OPENER AND STALK KNOCKER.

No. 517,960. Patented Apr. 10, 1894.

Witnesses
C. A. Ford.
N. S. Duvall.

Inventor
G. W. Murray,
By his Attorneys.
C. A. Snow & Co.

(No Model.) 2 Sheets—Sheet 2.

G. W. MURRAY.
COMBINED FURROW OPENER AND STALK KNOCKER.

No. 517,960. Patented Apr. 10, 1894.

Inventor:
G. W. Murray,

Witnesses:
C. A. Ford
N. S. Duvall

By his Attorneys.
C. A. Snow & Co.

THE NATIONAL LITHOGRAPHING COMPANY,
WASHINGTON, D. C.

UNITED STATES PATENT OFFICE.

GEORGE W. MURRAY, OF SUMTER, SOUTH CAROLINA.

COMBINED FURROW-OPENER AND STALK-KNOCKER.

SPECIFICATION forming part of Letters Patent No. 517,960, dated April 10, 1894.

Application filed July 19, 1893. Serial No. 480,932. (No model.)

*To all whom it may concern:*

Be it known that I, GEORGE W. MURRAY, a citizen of the United States, residing at Sumter, in the county of Sumter and State of South Carolina, have invented a new and useful Combined Furrow-Opener and Stalk-Knocker, of which the following is a specification.

My invention relates to a machine that has for its object to open center furrows, and simultaneously therewith knock or break stalks at each side thereof, said stalks being left upon the ground for the purpose of enriching the same.

With these and other objects in view, the invention consists in certain features of construction hereinafter specified and particularly pointed out in the claims.

Figure 1:
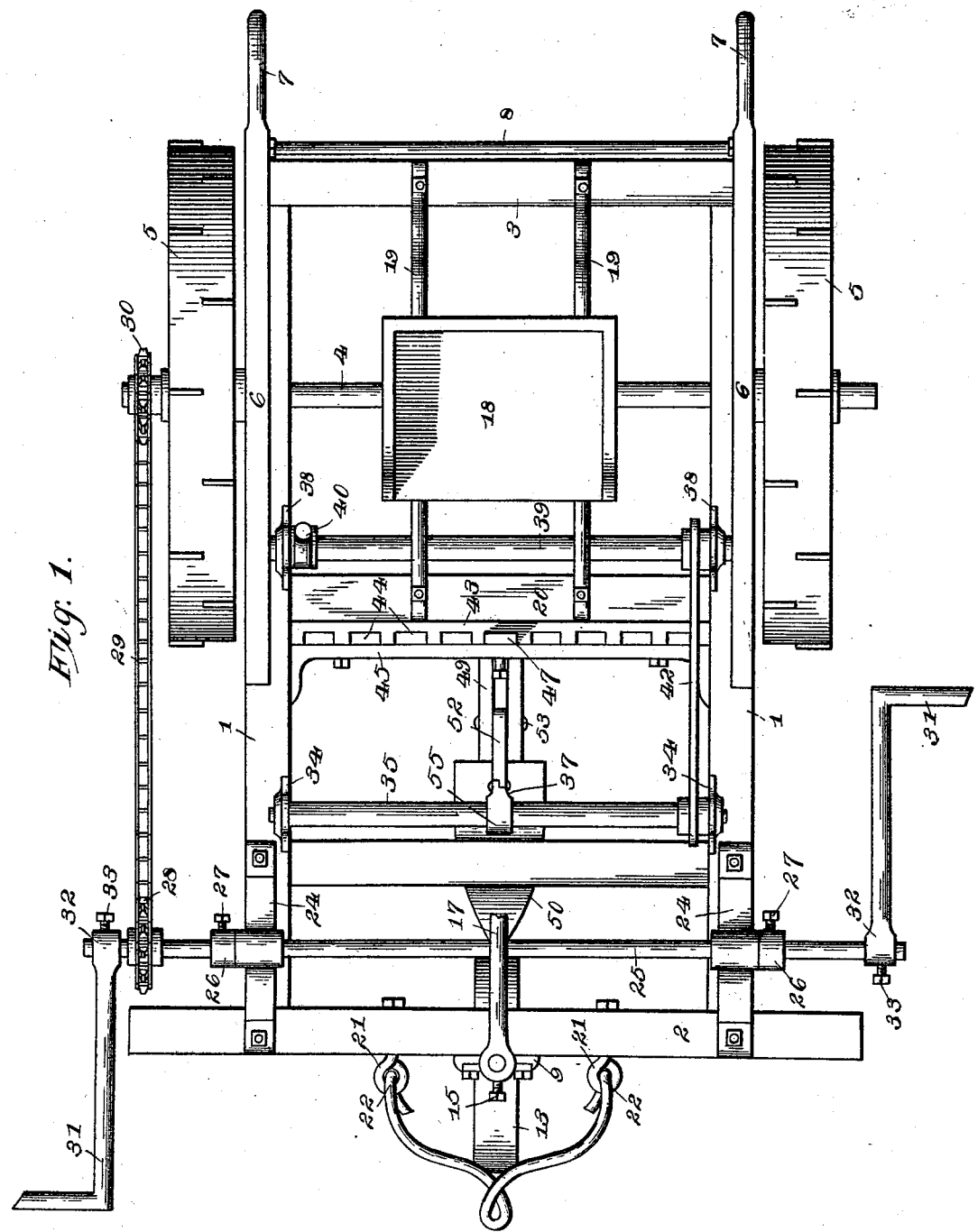
Figure 2:
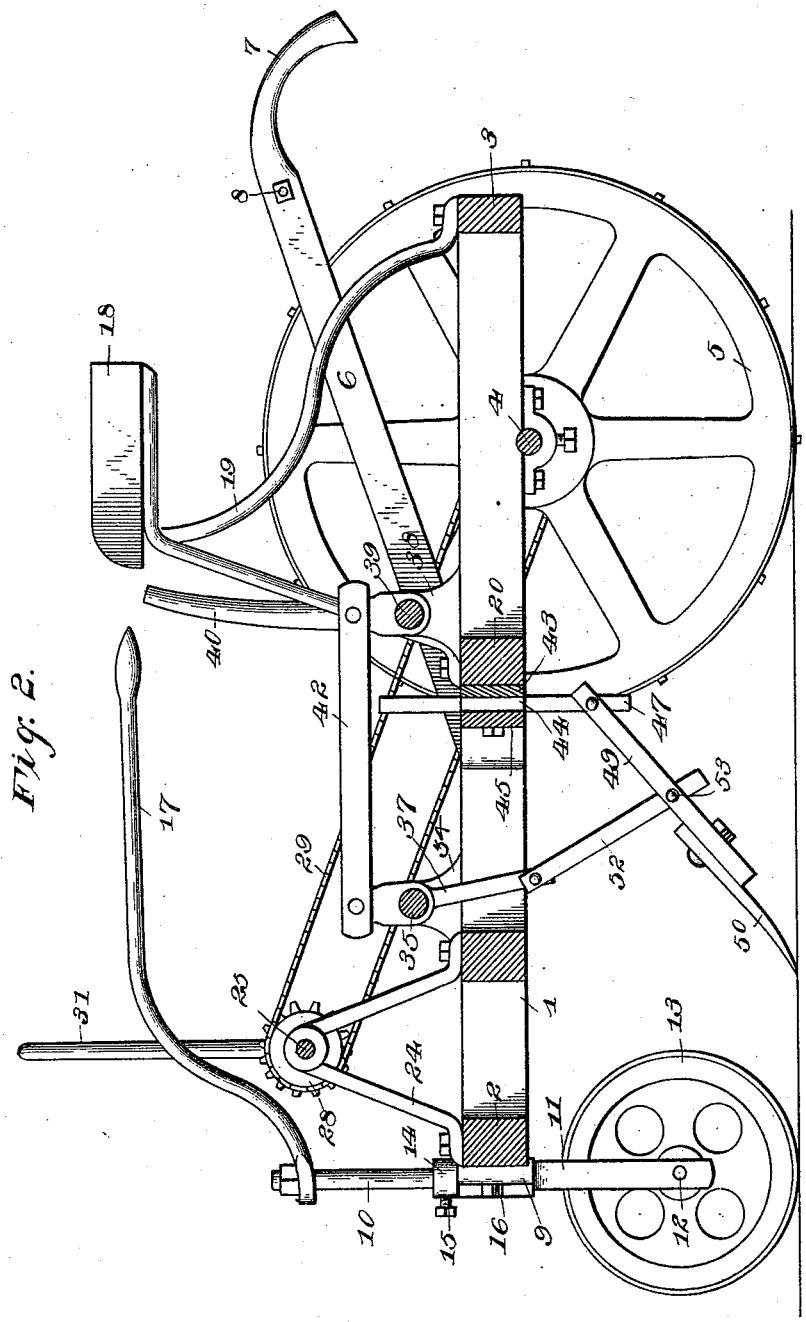

Referring to the drawings:—Figure 1 is a plan view of a machine embodying my invention. Fig. 2 is a vertical longitudinal central section thereof.

Like numerals of reference indicate like parts in both figures of the drawings.

In the practice of my invention I construct a strong rectangular frame, the same consisting of opposite longitudinal side-beams 1, and front and rear end-beams 2 and 3, respectively, the former projecting preferably beyond the beams 1. The beams 1 are provided near their rear ends with suitable bearings in which is journaled a transverse axle 4, which projects beyond the beams 2 and has mounted thereon ground-wheels 5. Handle-bars 6 are secured to the upper sides of the beams 1 and incline upward and rearward therefrom, finally terminating in hand-holds 7, in advance of which they are connected by a tie-rod 8. The center of the front beam 2 is provided with an eye or vertical bearing 9, in which is loosely swiveled the shank 10 formed at the upper end of a caster fork 11. The axle 12 is located in the fork and a caster-wheel 13 is loosely journaled thereon. Above the bearing-eye 9 a collar 14 is adjustably mounted on the shank 10, and a set-screw 15 is threaded laterally in the collar at a right-angle to its bore and impinges at its inner end upon the aforesaid shank 10. A set-screw 16 passes through the eye 9 and impinges upon the shank 10, when said set-screw will serve to maintain the shank at any point of its rotatable adjustment, so that the caster-wheel may be maintained directly in longitudinal alignment with the machine or at any angle thereto as preferred. To the upper end of the shank there is attached a rearward and horizontally disposed handle-lever 17 which terminates within reach of the operator when perched upon the seat 18 that may be provided for his accommodation, or if the seat is not employed, the handle may be extended rearward to within reach of the person following the machine. The handles 6 and 7 may also be omitted if desired, though I prefer to provide a machine with both handles and seat, in order that the driver may ride or walk. The seat may be supported in any suitable manner, and in the present instance is supported upon suitable standards 19 whose rear ends are secured to the rear beam 3 and whose front ends are secured to an intermediate transverse beam 20 located about midway the machine. Suitable draft-appliances will of course be provided at the front of the beam 2, and in the present instance a pair of eyes 21 are located in the beam and engage with hooks 22 in which a U-shaped draft-bail 23 is loosely engaged.

A pair of A-shaped standards 24, are located upon and bolted to the beams 1 at their front ends and are in transverse alignment. These standards terminate at their upper ends in suitable bearings in which a transverse shaft 25 is loosely journaled. The shaft 25 is provided with bearing-collars 26 at the outer sides of the bearings of the standards 24, and set-screws 27 pass through the collars and bear upon the shaft 25, whereby the latter is prevented from longitudinal movement. A sprocket-wheel 28 is located upon the shaft 25 near one of its ends, and is through the medium of a sprocket-chain 29 connected with a driving-sprocket 30 mounted upon the corresponding end of the axle 4 beyond one of the ground-wheels 5, whereby motion from said axle is conveyed to the shaft. The ends of the shaft 25 are provided with cranked-shaped knocking-arms 31, which at their inner ends terminate in eyes 32 that fit over the ends of the shaft 25 and are adjustable thereon by means of binding-screws 33 passed through the eyes and impinging upon the shaft. These arms are preferably oppositely disposed as shown and may be given any desired shape.

In a pair of bearing-standards 34 arranged transversely opposite each other in rear of the shaft 25 and extending from the beams 1 is located a rock-shaft 35, which is provided with upwardly and downwardly disposed rock-arms 36 and 37 respectively. A pair of bearings similar to the bearings 34 are located in rear of the same, and designated as 38, and they accommodate a rock-shaft 39 from which rises a hand-lever 40 for operating the same. This hand-lever 40 and the upper rock-arm of the shaft 35 are pivotally connected, as at 41, by a connecting-bar 42, so that when the shaft 39 is rocked by the lever 40 a similar movement is given to the shaft 35.

Immediately in front of and secured to the cross-beam 20 is a metal plate 43, whose front face is provided at intervals with vertical recesses or mortises 44. A clamping plate 45, is located in advance of the plate 43 and closes the openings or mortises 44, said plate 45 being held in position through the medium of bolts 46 passed through the two plates 45 and 43 at points between the mortises 44. An adjustable standard 47 is located in any one of the mortises 44 and depends below the same, the said standard being adjustable in said mortise in a vertical direction and capable of being secured in any of its adjusted positions through the medium of the clamping-plate 45. Pivoted to the lower end of the standard 47, as indicated at 48; and embracing the same, is an inclined shovel-carrying standard 49, the shovel 50 of which is secured in position in an adjustable manner through the medium of a heel-bolt 51, for the reception of which the said inclined standard 49 is slotted, as shown. A link 52 is pivoted as at 53 to the inclined standard 49 immediately above the shovel, and at its upper end is pivoted as at 54 to the lower extremity of the depending rock-arm 37 of the rock-shaft 35. This rock-arm it will be understood terminates at its upper end in an eye 55, and is capable of being slipped longitudinally upon the shaft 35.

It will be understood that a series of shovels 50 and their accessories, consisting of the standard 47, the inclined standard 49, link 52, and rock-arm 37, may be employed, but I have deemed it sufficient for the purpose of illustration to simply show one set of the same.

When the machine is employed as a gang-plow the knocking mechanism of course is not employed, though if desired they may be combined, the stalks being knocked down and covered up. By employing a machine for this purpose I obviate the necessity of knocking the stalks by hand as is oftentimes practiced. The stalks remain upon the ground, decay, and enrich the soil.

The operation of this class of machines is too well-known to require any specific description, and I will therefore limit my description to the operation of raising and lowering or otherwise adjusting the shovel or shovels as the case may be. It will be obvious that by pulling back upon the lever 40 the operator may elevate the plow entirely from the ground, and, furthermore, that by a forward throw of the same the point of the plow may be depressed and an opposite movement take place. Through the instrumentality of pivot-bolts 48, 53, and 54 it will be seen that the standard 47 may be raised and lowered so as to set the plow at various depths, and that the plow will maintain such adjustment after the standard has been secured in position by means of the clamping-plate 45.

I do not limit my invention to the precise details of construction hereinafter shown and described, but hold that I may make such variations as I may deem proper and expedient in the practice of my invention without departing from the spirit thereof or sacrificing any of the advantages.

Having described my invention, what I claim is—

1. In a machine of the class described, the combination with the rectangular frame, the opposite axle, the ground-wheels mounted for rotation therewith, and the sprocket-wheel carried by the axle, of bearings at the front end of the frame, a transverse shaft arranged in the bearings and terminating at its end in knocking-arms, a sprocket-wheel mounted on the shaft, and a sprocket-chain connecting said sprocket-wheel with that of the axle, substantially as specified.

2. In a machine of the class described, the combination with the framework, the transverse axle, the ground-wheels revolving therewith, and the sprocket-wheel arranged on the end of the axle, of standards arranged at the front end of the machine, a transverse shaft journaled in the standards and provided beyond the same with adjustable bearing-collars, a sprocket-wheel, a sprocket-chain connecting the same with that of the axle and oppositely disposed crank-shaped knocking-arms arranged upon the ends of the shaft and terminating at their inner ends in eyes, and provided with adjusting bolts, substantially as specified.

3. In a machine of the class described, the combination with the rectangular framework, the transverse bar having a mortise, a standard arranged in the mortise, a clamping-bar arranged over the standard, binding-bolts connecting the two, of an inclined standard slotted and pivoted to the lower end of the vertical standard and having at its lower end a shovel, and a link pivotally connected to the machine in advance of the vertical standard and pivotally connected at its lower end to the inclined standard above the shovel, substantially as specified.

4. In a machine of the class described, the combination with the framework, the transversely disposed plate having mortises in its front side, a transverse clamping-bar, and bolts passed through the same into the plate, of a standard located adjustably in one of said mortises and held in position by the bar, a slotted inclined standard pivoted to the lower end of the said adjustable standard and carrying a shovel, front and rear rock-shafts journaled in the frame, the front shaft being provided with rock-arms and the rear shaft with a lever, a connecting-bar between the lever and upper rock-arm of the front shaft, and a link pivotally connected to the rock-arm of the front shaft and to the inclined standard above the shaft, substantially as specified.

In testimony that I claim the foregoing as my own I have hereto affixed my signature in the presence of two witnesses.

GEORGE W. MURRAY.

Witnesses:
HENRY W. PURVIS,
JOHN L. C. SMALLS.